3,586,512
IMPARTING FRIED APPEARANCE TO BAKED FOODSTUFFS

John J. Mancuso, Astoria, and Betty F. Hagen, Irvington, N.Y., assignors to General Foods Corporation, White Plains, N.Y.
No Drawing. Continuation-in-part of application Ser. No. 489,388, Sept. 22, 1965. This application Aug. 18, 1969, Ser. No. 851,060
Int. Cl. A23l *1/12;* A23b *1/00, 7/00*
U.S. Cl. 99—100                                11 Claims

ABSTRACT OF THE DISCLOSURE

A composition of water-soluble food dye, edible fat and farinaceous material for coating foods prior to baking. Through the reaction from the baking heat and the concomitant moisture vapor from the food, the composition develops into an appealing coating having the appearance, odor, texture and color equivalent to that of ordinary coatings applied to foods which are the deep fat dried.

---

This application is a continuation-in-part of application Ser. No. 489,388, filed Sept. 22, 1965, and now abandoned, for Improved Food Product and Process.

BACKGROUND OF THE INVENTION (a) Field of the invention

The present invention relates, in general, to edible food coatings and, more particularly, is directed to a food coating to be applied to the food prior to baking for enhancing the appearance, odor and texture of the baked food.

(b) Description of the prior art

Many foods such as meat, fish, poultry, etc. are coated (breaded) prior to cooking by pan frying or deep fat frying.

For this type of cooking, the food is dusted with a light coating of flour or breadcrumbs, which on frying, develops into a crispy, savory, brown colored coating.

Recently, in order to avoid the danger, messiness, and the unfavorable dietary aspects associated with fried foods but also, to exploit the appealing odor, flavor, texture and appearance resulting from this manner of preparing food, products have been developed and applied to the surfaces of food which give a fried food appearance when the product and food are baked in an oven.

A baked product of the aforementioned type is disclosed by Rogers et al. (U.S. Pat. No. 2,910,370) who prepare a frozen poultry coated with a flavored batter consisting of bread, flour and water. The batter-coated food is treated with a supplementary fat coating and frozen. The breading and fat are selected to impart a brown color to the foodstuff when it is baked. Preparation of the coated food for consumption involves removing it from the freezer and baking it in an oven at high temperature until the product takes on a color approaching that of pan browned or deep fat fried food.

Other coatings have been developed for foodstuffs for the same purpose i.e., to provide a baked food with a surface similar in appearance, color and texture to that of coated deep fat fried food. These coatings rely on a high content of saturated fat combined with stearin to attain these stated purposes.

Additionally, coating mixtures comprising oleaginous material and grain flour (cf. Becker, U.S. Pat. No. 2,949,365) have been proposed for dusting foodstuffs such as bread and cakes to prevent their sticking to the baking pan.

The coatings and coated foodstuffs of the prior art, however, have certain pronounced deficiencies which are manifest in a dark brown unappealing color prior to baking and a waxy mouth feel. With respect to Rogers et al., extended cooking periods are necessary because of the frozen nature of the food, and, a limited selection of foodstuffs and the inapplicability to fresh vegetables, fish and meats are additional drawbacks.

The principal deficiency, however, of the food coatings of the prior art and the one which has evidently deterred the commercial success of these materials is that of their inability to develop the proper desirable golden brown color associated with deep fat fried foods when they are subjected to the more moderate temperatures employed within a baking oven, as compared with the high temperature and excellent heat transfer through the intimate contact with heated oil. Accordingly, if the temperature of the baking oven is raised to an exceedingly high temperature in an attempt to develop the anticipated brown color, that portion of the foodstuff in contact with the pan, and therefore subjected to the highest degree of heat, is overcooked and, in many instances, charred.

Since the baking of food has attained wide acceptance because of the more favorable dietary aspects associated with this type of cooking as compared with deep fat frying, there has existed a need for a food coating for fresh meats, vegetables, fish, etc. which, upon being applied to the surface of the foodstuff and then baked, yields an appealing golded brown flavorful cooked coating.

It is especially important that, unlike the coatings of the prior art, means be provided to effect a uniform golden brown color to the coating about the entire surface of the foodstuff when the foodstuff is completely cooked by employing the usual baking temperatures and residence time in the oven and avoiding the necessity to induce the browning color by resorting to extremely high oven temperatures leading to potential charring of the foodstuff and coating.

SUMMARY OF THE INVENTION

Accordingly, it is a main object of this invention to provide an edible food coating which has the capability to develop a uniform golden brown color when applied to foodstuffs and subsequently baked at ordinary baking oven temperatures.

It is a principal object of this invention to provide an edible food coating which may be employed for coating fresh or frozen meat, fish, poultry and vegetables to produce a fried food color, appearance, taste and odor when these foodstuffs are baked in an oven.

It is an object of this invention to provide an edible food coating in flowable, powdered form which may be readily applied to the foodstuff prior to baking by dusting or by shaking the foodstuff and coating within a bag or other suitable container. Advantageously, the food coating of this invention does not have to be prepared in batter form and brushed onto the foodstuff.

It is still another object of the invention to provide an edible food coating which has an attractive light whitish color similar to coarse flour when applied to the surface of the unbaked foodstuff.

It is another object of this invention to provide an edible food coating which has means incorporated for promoting adhesion of the coating to the foodstuff to insure a uniform layer of coating over the surface of the foodstuff.

It is a feature of the coating of the present invention that a variety of distinguishable flavors can be incorporated with the base components such that the consumer can select from a line of differently flavored coatings, a coating having a flavor to augment and/or complement that of the foodstuff to be coated and baked.

It is another feature of the product of this invention that, although applied to the foodsuff in powdered form, upon being subjected to the heat of a baking oven, it develops into a smooth shiny appearing coating having excellent visual appeal.

Briefly stated, the objects of this invention are accomplished by blending to a homogenous mixture a synergetic combination of powdered ingredients including a farinaceous material, powdered fat, a hydrophilic binder, suitable flavoring and, most importantly, a mixture of selected edible water-soluble dyes incorporated with a suitable carrier.

The essence of the invention resides in the effective and unexpected development of an appealing deep fat-type cooked brown color imparted to the food coating. The appealing color is developed from the substantially colorless blend of water-soluble dye materials incorporated in the coating mix through contact with the moisture vapor released from the foodstuff incident to baking at a moderate hot oven temperaure. The moisture vapor permeates through the finite food coating layer encompassing the foodstuff and progressively converts the dye materials to the appealing golden brown color associated with deep fat fried coated food.

The invention also comprehends a food coating in which is incorporated hydrophilic binder with a three-fold functionality. The binder functions to assure the foodstuff is completely covered with a food coating of finite uniform thickness for aesthetic appearance and taste appeal. Also, the uniformity of the food coating thickness substantially eliminates the visual detection of any color development of those dye materials in direct contact with the moist surface of the foodstuff prior to baking and, in addition, the hydrophilic binder by sorption of a portion of the moisture vapor as it is released from the foodstuff during baking, modulates the rate at which the substantially colorless dye materials take up water and, accordingly, is a major factor in controlling the rate of color development of the food coating at a desirable rate during the baking operation.

The synergetic functionality of the components of the food coating, and the above, and additional objects, features, and advantages of the product of this invention will become more fully apparent upon consideration of the following detailed description of the preferred embodiments.

DESCRIPTION OF THE PREFERRED EMBODIMENTS

The food coating of this invention is a dry, flowable mix having an appearance similar to finely ground bread crumbs. Uniformly dispersed throughout the matrix of powdered fat and farinaceous material are particles of spices and other flavoring agents, a binder, and dye blends (the dye blends being affixed to a carrier) which enhance the visual appeal of the product by providing an excellent semblance of minute bread crust particles.

The food coating mix is packaged in a laminated foil envelope or similar hermetically sealed package to avoid the sorption of moisture prior to use and thereby retains its characteristic flowable attribute.

Preferably, in practice the consumer empties the content of the envelope into a polyethylene sack or equivalent and, subsequent to wetting the surface of the foodstuff to be coated, places the foodstuff in the sack with the food coating and shakes or otherwise agitates the sack to uniformly distribute the food coating over the surfaces of the foodstuff. The foodstuff is removed from the sack and the procedure is repeated until the desired quantity of foodstuff is coated. This modified cascade method of distributing the food coating is particularly suitable for relatively small articles of food such as sliced potatoes and vegetables. Alternately, and especially for large pieces of meat or fish, the coating may be placed in a pan or other shallow container with the wetted food and dusted or otherwise spread over the food surface.

The meat, fish, vegetables, etc. after being uniformly coated have the appearance of food normally coated with a starch-based coating for deep fat frying.

The coated food is then baked at a moderate hot temperature (375° F. to 425° F.). As the food is being cooked, the aqueous film (water or milk) applied to the food for the purpose of adherance of the coating and the natural moisture of the food is converted to moisture vapor which permeates through the coating and solubilizes the substantially colorless dye blends whereby a golden brown color is developed which progressively converts the coatings to one having the appearance of being subjected to deep fat frying. Coincidentally with the color development, the powdered fat is melted and spreads throughout the coating forming a tender, mimetic moist-appearing surface. The farinaceous ingredients add a crispy texture to the coating and the spices and flavoring ingredients complement the appealing aroma and flavor of the food product.

As previously stated, the food coating of this invention is applicable to meats, fish and vegetables. These foods may be fresh, frozen or canned prior to being coated. The coating is also useful for dehydrated foods provided these foods are suitably rehydrated prior to application of the food coating.

Since the food coating of this invention is applicable to a large variety of foodstuffs it has been found advantageous to formulate a series of coatings having individual spice and flavoring ingredients which augment and otherwise enhance the flavor of the particular food to be coated, i.e., food coatings individually formulated for pork, beef, chicken, etc.

Importantly, it has also been determined that superior baked coatings can be effected if the fat content of the coating is tailored to that of an optimum quantity for complementing the fat content of the foodstuff. For example, the food coating formulated for pork should have a much lower powdered fat content than the food coatings formulated for beef or vegetables. As a practical matter, the food coatings with respect to fat content have been formulated into two broad catagories—a high fat variety and a low fat variety.

The high fat variety of food coating is formulated with about 20% to about 70% by weight of free-flowing powdered fat. The low fat variety of the coating of the invention has less than 20% fat and has a minimum fat content of about 2–3%.

The fat employed in both varieties of coatings melts at a relatively high temperature (capillary melting point of 110° F. to 145° F.) and may be any animal or vegetable fat, either hydrogenated or not, which meets this requirement in order that the fat, in subdivided form dispersed throughout the mix, is a solid during shipping and storage at normal room temperature and has the capability of melting at the oven temperature employed for baking the coated foodstuff.

Preferably, the low fat variety of food coating has incorporated less than 20% of an edible fat having a capillary melting point of 110° F. to 145° F. and an iodine number of 45 or below and is substantially free of stearins or other waxy materials. Ideally, the fat should have a capillary melting point between 120° F. and 135° F. and an iodine value of 20 or less.

Particularly preferred are fats obtained from oils which are hydrogenated to reduce unsaturation and fractionally crystallized or otherwise treated to remove stearins and other waxes. Domestic oils from soybean, cottonseed, corn and peanut having iodine values of 20 or less are ideally suited for forming fats substantially free of stearins and other waxes and are therefore preferred for formulations where saturated fat is a dietary consideration of appreciable importance. Furthermore, the low stearin-containing fats impart less of a waxy mouth feel than those containing this substance.

The high fat formulations containing 20 to 70% edible fat may be of edible vegetable or animal fat and preferably material such as hydrogenated vegetable oil, i.e. hydrogenated cottonseed oil, hydrogenated coconut oil, hydrogenated corn oil and the like, with or without materials such as stearin. It is desirable that the edible fat have a softening point of 100 to 145° F., preferably a softening point of 103° F. to about 108° F. and a capillary melting point of 109° F. to 112° F.

Fat particle size, while not critical, should be such to give a uniform blend and coating. A typical powdered fat, useful in this invention, has particles such that a maximum of 1.5% is retained on a U.S. Standard #30 screen, a minimum of 95% passes through a U.S. Standard #35 screen and a maximum of 10% passes through a U.S. Standard #100 screen, all percentages based on weight.

The edible fat employed in this invention is either puchased commercially or may be prepared from some solid fat by several methods. The fat may be melted and sprayed through conventional spray nozzles into a mixing zone maintained at a temperature below the melting point of the fat thereby obtaining discrete solid or semi-solid fat particles. Alternatively, the fat in solid form may be mixed with Dry Ice and ground in conventional equipment into the discrete particles.

The powdered fat, upon melting, conditions the surface of the foodstuff so it remains soft and tender. The melted fat eliminates the large build-up of crust-like material on the surface of the baked fodstuff and thereby improves the simulated deep fat fried effect.

The farinaceous material content of the food coating mix is usually a flour prepared from wheat, corn or oats or mixtures of these grains. Importantly, however, by-products from other food operations in the nature of cereal fines and bread and pastry crumbs are equally suitable alone or in combination with the flours. The important criteria with respect to the farinaceous material are that it be of a light tan or cream-like color so as to not present the appearance of a pre-cooked food coating mix and that it not impart any discernible flavor not compatible with the foodstuff to be coated.

The particle size of the farinaceous material is not critical but it should be of a fineness to assure good blending with other ingredients and uniform coating of the food product. A typical screen fraction for bread or pastry crumbs is 2% on U.S. Standard #14 mesh, 70% through U.S. #35 and 10% maximum through U.S. #100. For cereal fines and grain flours a typical screen fraction is 4% on U.S. #14, 45% on U.S. #35 and 20% on U.S. #100 screen.

The proportional quantity of farinaceous material employed in the food coating mix is dependent primarily on the fat content of the mix. For the low fat variety the farinaceous material content will range from about 60% to 80% and for the high fat content food coating the respective farinaceous material content will range from 15% to 60%.

Suitable flavoring and flavor-enhancing ingredients which find applicability as components in the prepared food coating mix of the invention include salt, sugar, monosodium glutamate, mustard powder, celery seed, paprika, garlic, pepper, natural hickory smoke flavor, other smoke flavors, either natural or synthetic, malted barley and the like.

These ingredients, by their very nature, are employed in relatively small quantities, the combined flavor-enhancing level ranging between about 3% to about 18% of the total prepared food coating.

Additionally, the food coating preferably contains a hydrophilic binding material. Although not strictly essential to the successful utility of the invention, the use of a binder material is especially preferred in order to have the coating display a high degree of cohesive and adhesive forces which will assure a coating of uniform thickness adhering to the entire surface of the foodstuff prior to, and after, baking. It is especially important that the coating be uniformly applied to the moistened foodstuff prior to baking and be of such thickness that any color developed from the dye blend in direct contact with the wetted surface be masked by the overlay of the bulk of the food coating particles. The utility of the binder to assure such a uniformly thick coating attains added importance when, for example, the consumer applies the coating and then, for one reason or another, delays for an extended period of time to bake the coated foodstuff. On these occasions, in order to avoid discerning the development of color from the water-soluble dye blend, it is essential that the binder act to effect a coating of adequate uniform thickness.

Although not as important as the aforementioned function, the hydrophilic binder also serves to sorp moisture vapor emanating from the coated foodstuff as it is being baked. In so doing, the binder, in effect, brakes the rate at which the dyes would otherwise develop color and thus serves to assure color development at a rate more nearly commensurate with the rate at which the cooking process is progressing.

For purposes of this invention, it has been established that such hydrophilic binders as gelatin, starch, alpha cellulose, dry milk solids, carboxymethyl cellulose, concentrated soy protein, alginates and gums such as gum arabic and others provide the abovementioned functionality to a satisfactory extent when included individually or as mixtures in the food coating mix to an extent ranging from about 2% to about 15%.

Color development of the food coating mix is the most important feature of the invention and, as such, requires the rather extensive description which follows.

The dyes used in the product of the invention as precursors of the desired deep fat fried-type color may be any suitable water-soluble dye which is acceptable and approved for food use. Thus, any of the dyes (colors) certified by the Food and Drug Administration for Food, Drug and Cosmetic Use (F.D.C.) may be employed alone or in combination to produce the brown, pan fried or deep fat fried coloring desired.

Although the dye materials may be employed by direct incorporation in the coating blend, it is preferred that they first be incorporated with a suitable carrier such as corn syrup solids, fruit sugars, sucrose, dextrose and similar water-soluble materials.

When the dyes are so incorporated with the carrier, the resultant mixture is generally referred to as a "color mixture" or simply a "color." It is important at this point that the distinction be recognized between the term "color" for the dye-carrier mixture and the "developed color" of the food coating during and after baking. The former "color" or dye-carrier mixture actually is substantially colorless or, at most, exhibits a light tannish shade. It is only upon being moistened that the desirable distinct brown coloring is developed from the dye-carrier mixture.

In preparing the color mixture suitable proportions of the various dyes required may be simply blended with the carrier until a uniform dry composition is obtained. While any reasonable amount of carrier may be employed, it is better that the carrier for the dyes be present in a major proportion of the coloring mixture. Preferably, the dye carrier is present in a proportion from 60 to 90%, more particularly about 88% of the coloring mixture.

While the dye may be simply blended with the dry carrier such as sugar, it is preferred to wet blend the F.D.C. dyes with the sugar and then dry the resultant color mixture. Other techniques well known in the food art may be employed to prepare the color mixture (sometimes referred to as a color blend) which should preferably contain about 88% carrier and 12% F.D.C. approved food dye (at times referred to as F.D.C. approved "food color").

The food coating of this invention is prepared by mixing the farinaceous material with the flavoring and coloring mixture until a uniform blend is obtained. This mixture is then mixed with the powdered, edible fat and the entire mix blended until a uniform mixture is obtained. The exact method of adding the coloring and other ingredients together to form a finished food coating composition is not critical provided as the coloring mixture is added so as to be dispersed uniformly throughout the food coating material and to form a lightly colored coating material.

The finished color of the coating material may vary from almost a starch-like white to a light toast or beige colored mixture. The mixture is not uniformly colored, but consists of some dark particles of flavor and coloring ingredients, however, the general overall appearance is that of an uncooked coating material and not that of a coating which has been deep fat cooked. In some respects the blended food coating as packaged for distribution may be characterized as having a finely divided bread crumb appearance wherein lightly colored particles ranging from beige to tan in color and resembling particles of bread crust are uniformly distributed throughout a white matrix.

Summarizing, the instant invention, broadly stated, encompasses a unique food coating especially formulated for application to the surfaces of foods to be cooked by baking. The crux of the invention resides in the unexpected discovery that a substantially colorless dye-carrier mixture alone or, preferably, in conjunction with a suitable binder incorporated in the food coating, will, by sorption of moisture incident to the baking of the food at moderately hot oven temperatures, impart to the food coating a coloring similar to that of a deep fat fried coating and will develop said coloring at a rate commensurate to the rate at which the food is being cooked.

The following examples are illustrative but are not to be construed as limiting as to the preparation and use of the food coating product of this invention. The percentages expressed are on a weight basis unless otherwise indicated.

EXAMPLE I

| Formulation | Percent | Percent by weight |
|---|---|---|
| Hydrogenated coconut oil | | 66.00 |
| All purpose flour | | 28.87 |
| Salt | | 4.13 |
| Monosodium glutamate | | 0.83 |
| Color blend A | | 0.12 |
| Sugar | 88.80 | |
| F.D.C. Yellow #5 dye | 7.09 | |
| F.D.C. Yellow #6 dye | 2.35 | |
| F.D.C. Red #2 dye | 1.63 | |
| F.D.C. Blue #1 dye | 0.17 | |
| Total | 100.00 | |
| Color blend B | | 0.05 |
| Sugar | 87.40 | |
| F.D.C. Yellow #6 dye | 12.16 | |
| F.D.C. Red #2 dye | 0.44 | |
| Total | 100.00 | 100.00 |

Procedure

The color blends used were fine ground in a mortar, with the salt and monosodium glutamate. This mixture of salt and color blends was then further blended in a Hobart type blender with the flour and the previously powdered fat, in that order, mixing continuously until the ingredients were thoroughly mixed.

French cut raw potatoes, which had been previously moistened with water, were coated with the formulation prepared as described above and baked in an oven at 425° F. for 20 minutes. The resulting materials had the character, color and texture imparted by deep fat frying.

This example illustrates the utility of a high fat variety of food coating mixture of the invention and one in which the desired color simulating deep fat frying can be attained without the use of a binder material.

EXAMPLE II

Formulation: Percent by weight
Hydrogen coconut oil _____ 66.00
Wheat flour _____ 18.83
Salt _____ 8.00
Powdered alpha-cellulose (Avicel) _____ 3.00
Tricalcium phosphate _____ 3.00
Monosodium glutamate _____ 1.00
Color blend A (as in Example I) _____ 0.12
Color blend B (as in Example I) _____ 0.05
                                          ——————
                                           100.00

Procedure

The color blends were blended in a mixture of the salt, monosodium glutamate and wheat flour. After thoroughly mixing there was blended therein the hydrogenated coconut oil which had been previously ground to a powder with Dry Ice, and mixed with the Avicel, and the tricalcium phosphate.

The composition was used as follows; potatoes were peeled, washed and sliced as for french frying. They were then shaken to remove excess water and placed, a handful at a time, in a bag containing the mix. The bag was shaken until the potatoes were evenly coated with a thin layer of the composition. The potatoes were then removed and placed in a single layer on a cookie sheet and baked for 25 or 30 minutes at 425° F. The resulting product had the appearance, taste, and odor of french fried potatoes.

This example illustrates a formulation wherein a hydrophilic binder (Avicel) is included. The tricalcium phosphate is incorporated for the purpose of making the high fat-containing mixture more free-flowing.

EXAMPLE III

Formulation: Percent by weight
Hydrogenated coconut oil [1] _____ 30.00
Corn flakes fines _____ 22.33
Bread crumbs _____ 22.33
Wheat flour _____ 14.86
Gelatin _____ 7.30
Salt _____ 2.83
Color blend A (cf. Example I) _____ 0.26
Color blend B (cf. Example I) _____ 0.09
                                          ——————
                                           100.00

[1] Capillary melting point 109°–112° F.; softening point 103°–106° F.

Procedure

The color blends were finely ground with the salt in a mortar. This mixture was then blended in a Hobart-type mixer with the flour, the dry gelatin, the crumbs and the fines and the previously powdered fat.

According to the procedure described in connection with Example II above for potatoes, fried chicken pieces were coated and baked in an oven at 425° F. for from 25 to 35 minutes. The resulting chicken had the desirable appearance and taste of crisp deep fat fried chicken.

This example shows the application of a combination of bread crumbs, cereal fines and flour as the farinaceous material cooperating with a much lower fat level than that of Example I and II to provide a crispier type texture coating for the chicken. The gelatin is employed as the hydrophilic binder.

EXAMPLE IV

| Formulation | Percent | Percent by weight |
|---|---|---|
| Hydrogenated coconut oil | | 25.623 |
| 80% coconut oil | | |
| 20% stearin | | |
| Cereal fines (Grape-Nuts fines) | | 19.077 |
| Wheat flour | 83.249 | |
| Malted barley flour | 15.100 | |
| Sugar | 1.530 | |
| Salt | 0.104 | |
| Enzyme | 0.017 | |
| Total | 100.000 | |
| Bread crumbs | | 19.077 |
| Flour | | 12.706 |
| Salt | | 7.250 |
| Gelatin | | 6.225 |
| Lemon juice powder | | 5.200 |
| Monosodium glutamate | | 3.625 |
| Citric acid | | .860 |
| Color blend A: (see Example I) | | .220 |
| Color blend B: (see Example I) | | .073 |
| White pepper | | .055 |
| Total | | 100.000 |

Procedure

The coloring materials were admixed with citric acid, monosodium glutamate and salt and ground finely in a mortar. This powder was then admixed with the farinaceous material, the gelatin, lemon juice powder and white pepper in a Hobart blender and blended for 10 minutes. Powdered Dry Ice was then added to the blend and the mixing continued until the ice was dissipated. There was then added the hydrogenated fat which had previously been powdered by grinding with Dry Ice, and the blending was continued for a total of 5 minutes. Fish fillets were then dipped in milk and coated with the above composition. After baking in an oven of 425° F. for 15 minutes the resulting food product had the appearance, odor and taste of French fried fish.

The lemon juice powder and white pepper illustrate the application of specific ingredients to complement the aroma and taste of the coated baked food.

EXAMPLE V

| Formulation | Percent | Percent by weight |
|---|---|---|
| Hydrogenated vegetable oil | | 27.280 |
| Hydrogenated coconut oil | 80 | |
| Stearin | 20 | |
| Cereal fines | | 20.304 |
| Wheat flour | 83.249 | |
| Malted barley flour | 15.100 | |
| Salt | 1.530 | |
| Yeast | 0.104 | |
| Enzyme | 0.017 | |
| Total | 100.000 | |
| Bread crumbs | | 20.304 |
| Wheat flour | | 13.525 |
| Spice premix | | 11.650 |
| Salt | 65.391 | |
| Sugar | 11.133 | |
| Spices | 7.308 | |
| Mustard powder | 3.519 | |
| Ground celery seed | 2.923 | |
| Ground paprika | 2.634 | |
| Corn starch | 1.759 | |
| Monosodium glutamate | 1.471 | |
| Natural liquid | | |
| Hickory smoke | 1.471 | |
| Garlic powder | 1.471 | |
| Ground black pepper | .920 | |
| Total | 100.000 | |
| Gelatin | | 6.625 |
| Color blend A: (see Example I) | | .234 |
| Color blend B: (see Example I) | | .078 |
| Total | | 100.000 |

Procedure

The color components were mixed with the salt and ground finely in the mortar. This material was then blended with the gelatin, the premixed spices, and the farinaceous materials until thoroughly mixed in a Hobart blender. The fat, which had been solidified and powdered by grinding with Dry Ice, was added to the mixture and mixing continued for a total of 15 minutes.

This preparation when used to coat chicken parts previously moistened with milk and then baked in an oven for 25 minutes at 425° F. imparted the characteristic appearance, odor and taste of deep fat fried chicken.

EXAMPLE VI

Formulation: Percent by weight
- Powdered fat [1] _____ 100.00
- Wheat flour _____ 13.50
- Grape-Nuts fines _____ 41.35
- Bread crumbs _____ 20.00
- Salt _____ 8.00
- Powdered alpha-cellulose (Avicel) _____ 3.00
- Tricalcium phosphate _____ 3.00
- Monosodium glutamate _____ 1.00
- Color blend (cf. Example I) _____ 0.15

100.00

[1] Domestic fat having capillary melting point of 120–135° F. and an iodine number of 30 or less.

F.D.C. dyes were blended and dissolved in water, the dyes being balanced to give a fried potato appearance when placed on a baked potato. The dye solution containing 12 parts of a formulation equivalent to that of the dyes employed in Example I were sprayed in a fine mist onto 88 parts of sugar as the sugar was agitated in a blender. The sugar was agitated until all of the color solution was incorporated uniformly in the sugar. Thereafter, while mixing continued, warm air was introduced to evaporate excess water. On drying, the light tan color mixture was blended into the powdered fat which has been previously ground to a powder with Dry Ice.

Potatoes were peeled, washed and sliced as for French frying. They were then shaken to remove excess water and placed, a handful at a time, in a bag containing the coating mix. The bag was shaken until the potatoes were evenly coated with a thin layer of the formulation. The potatoes were then removed and placed in a single layer on a cookie sheet and baked for 25 or 30 minutes at 425° F.

The baked potatoes had a uniformly golden brown color coating. The coating was crispy and of a coarser texture than that in Example I due to the much lower fat content of the coating. However, the low fat content is especially appreciated by those concerned about this constituent in their diet.

EXAMPLE VII

Formulation: Percent by weight
- Domestic fat _____ 14.0
- Cereal fines _____ 30.0
- Bread crumbs _____ 30.0
- Flour _____ 13.0
- Salt _____ 7.3
- Gelatin _____ 6.2
- Lemon juice powder _____ 5.2
- Monosodium glutamate _____ 3.6
- Citric acid _____ 0.9
- Color blends (cf. Example I) _____ 0.3
- White pepper _____ Trace The color blends were admixed with citric acid, monosodium glutamate and salt and ground finely in a mortar. This powder was then admixed with the farinaceous material, the gelatin, lemon juice powder, and white pepper in a Hobart blender and blended for 10 minutes. Powdered domestic fat was added and blending continued until a uniform mixture was obtained.

Fish fillets were dipped in milk or water, drained and shaken with the dry mix previously prepared. The fish were arranged in a single layer on a greased baking sheet and baked 20 minutes at 400° F. or until the fish could be flaked with a fork.

Several variations of the low fat variety formula illustrated in the above example are appropriate. The gelatin binder may be replaced with approximately an equal quantity of carboxy methyl cellulose or other binders and, if preferred, the binder can be omitted from the formula.

EXAMPLE VIII

| Formulation: | Parts by weight |
|---|---|
| Powdered domestic fat | 5.9 |
| Post Toasties brand corn flakes fines | 53.6 |
| National crisp film starch | 13.4 |
| Wheat flour | 11.8 |
| Salt | 7.3 |
| MSG | 5.9 |
| Onion powder | 0.8 |
| Ground savory | 0.5 |
| Ground sage | 0.5 |
| Color blend A[1] | 0.218 |
| Color blend B[2] | 0.075 |
| Black pepper | Trace |

| [1] Color blend A: | Percent |
|---|---|
| Fruit Granulated sugar | 88.8 |
| Yellow #5 (F.D.C.) | 7.0 |
| Yellow #6 (F.D.C.) | 2.35 |
| Red #2 (F.D.C.) | 1.68 |
| Blue #1 (F.D.C.) | 0.17 |
| | 100.00 |

| [2] Color blend B: | Percent |
|---|---|
| Fruit granulated sugar | 87.40 |
| Yellow #6 (F.D.C.) | 12.16 |
| Red #2 (F.D.C.) | 0.44 |
| | 100.00 |

The fruit sugar was placed in a blender and an aqueous solution of the F.D.C. dyes were carefully poured slowly into the sugar as it was blended. Blending was continued until a uniform blend was obtained which was then dried to produce a uniform light tannish color blend for addition to the final coating mixture which was prepared in a manner similar to that employed in Example VII.

Pork chops were moistened with milk and shaken with the above blend. The coated pork was baked in a 425° F. over for 30–45 minutes. The finished product had an excellent appearing golden brown color, a crispy texture and a savory aroma and taste.

The above example is ilustrative of a low variety fat food coating especially adapted for a food product having a high fat content.

In this and the following example, the National Crisp Film Starch was employed as the binder.

EXAMPLE IX

The formulation of Example VIII was modified by increasing the fat content by 10% of the weight of the coating (at the expense of the cereal fines) and, when coated on veal produced an excellent coating in all respects when the coated veal was baked for about 30–45 minutes at 425° F.

While the foregoing has illustrated and described what is now contemplated to be the best mode of carrying out the invention, the preferred embodiments are, of course, subject to modification without departing from the spirit and scope of the invention. Therefore, it is not desired to restrict the invention to the particular embodiments illustrated and described, but to cover all modification that may fall within the scope of the appended claims.

Having described the invention, what is claimed as new and desired to be secured by Letters Patent is:

1. A blended food coating composition which, when coated on food and baked, gives the resulting food the appearance and taste of fried food, said coating composition comprises 20–70% edible powdered fat, 15% or more farinaceous material, flavoring ingredients and containing an effective amount of a substantially colorless dry color blend for producing a fried food coloring to the food coating composition when the food coating composition is baked in the presence of moisture vapor, said blend containing water soluble F.D.C. dye as the only coloring agent.

2. The blended food coating composition set forth in claim 1 wherein the food to be coated is selected from the group consisting of meat, fish, and vegetables.

3. The food coating composition of claim 2 wherein the color blend ranges from about 0.15 to about 0.35 weight percent based on the weight of the total composition.

4. The food coating composition of claim 2 wherein the F.D.C. dye is selected from the group consisting of Yellow No. 5, Yellow No. 6, Red No. 2, Blue No. 1, and mixtures thereof.

5. The composition of claim 3 which further includes a binder and the flavoring ingredient includes salt.

6. The composition according to claim 5 wherein the binder is gelatin.

7. The blended food coating composition according to claim 2 wherein the farinaceous material is selected from the group consisting of flour, cereal fines, bread crumbs and mixtures thereof.

8. A process for imparting the taste and appearance of deep fat frying to foodstuffs which comprises;
 (a) moistening the surface of the foodstuff with an aqueous liquid,
 (b) coating the moistened foodstuff with a composition according to claim 1.
 (c) baking said coated foodstuff in an oven, said baked fodstuff having the appearance and taste of fried food.

9. The process of claim 8 wherein the foodstuff is selected from the group consisting of meat, fish, and vegetables.

10. In the process of baking coated foodstuffs, the improvement comprising adding an effective amount of a substantially colorless dry color blend of 0.15 to about 0.35 weight percent based on the weight of the total composition, said color blend containing water soluble F.D.C. dye as the only coloring agent, to a dry coating mix comprising edible powdered fat, farinaceous material, and flavoring ingredients, wherein a fried food coloring is imparted to the foodstuff coating when the coated foodstuff is baked in the presence of moisture vapor.

11. The invention according to claim 10 wherein the foodstuff is selected from the group consisting of meat, fish and vegetables.

References Cited

UNITED STATES PATENTS

| 2,910,370 | 10/1959 | Rogers et al. | 99—169X |
| 2,949,365 | 8/1960 | Becker | 99—169X |
| 3,052,545 | 9/1962 | Ducharme et al. | 99—169X |
| 3,397,063 | 8/1968 | Carlson et al. | 99—148X |
| 3,078,172 | 2/1963 | Libby | 99—94X |

LIONEL M. SHAPIRO, Primary Examiner

D. M. NAFF, Assistant Examiner

U.S. Cl. X.R.

99—1, 83, 94, 107, 111, 118, 148, 168, 169

UNITED STATES PATENT OFFICE
CERTIFICATE OF CORRECTION

Patent No. 3,586,512     Dated June 22, 1971

Inventor(s) John J. Mancuso & Betty F. Hagan

It is certified that error appears in the above-identified patent and that said Letters Patent are hereby corrected as shown below:

Column 1, line 4, change "Hagen" to --Hagan--.

Column 1, line 21, change "dried" to --fried--.

Column 5, line 41, change "fodstuff" to --foodstuff--.

Column 8, line 39, change "french" to --French--.

Column 9, line 4, change "25.623" to --25.632--.

Column 10, line 9, change "100.00" to --10.00--.

Column 11, line 41, change "over" to --oven--.

Column 12, line 34, replace the period with a comma.

Column 12, line 36, change "fodstuff" to --foodstuff--.

Signed and sealed this 15th day of February 1972.

(SEAL)
Attest:

EDWARD M. FLETCHER, JR.  
Attesting Officer

ROBERT GOTTSCHALK  
Commissioner of Patents